Inventors:
Victor W. Peterson and
Otto J. Maha.
By: Roland C. Rehm
Atty.

Patented May 13, 1941

2,241,645

UNITED STATES PATENT OFFICE 2,241,645

PRESS AND THE LIKE

Victor W. Peterson and Otto J. Maha, Chicago, Ill., assignors to Hannifin Manufacturing Co., Chicago, Ill., a corporation of Illinois Application July 20, 1936, Serial No. 91,630

17 Claims. (Cl. 60—52)

This invention relates to riveting and other presses and, among other objects, aims to provide a compact unit which is rapid in operation and yet is capable of exerting high pressures at the appropriate point in the cycle of operations.

The invention may be readily understood by one illustrative apparatus embodying the invention and shown in the accompanying drawings.

While the invention is here shown embodied in a riveting apparatus, it will be apparent that the invention is capable of use in other apparatus requiring the exertion of high pressure at some point in the cycle of operations. The present apparatus is designed to cold head rivets of substantial size, for example three-eighths inch soft steel rivets, and in this instance is made extremely mobile in character so that the riveter can be shifted quickly and easily from rivet to rivet. It is also capable of reaching rivets which heretofore have been difficult of access.

The tool itself comprises a small, light weight press yoke 10 made of heat treated alloy steel having a strength of about 200,000 pounds per square inch and capable of withstanding working stresses up to 175,000 pounds per square inch. For heading a three-eighths inch cold rivet where the maximum heading pressure exerted by the riveter is about 35,000 pounds, the use of steel of this character makes it possible to make a yoke riveter which with the piston 11, the riveting tool and the cylinder 12 weighs only about fifty pounds and which may therefore be maneuvered more easily and quickly than heretofore into engagement with successive rivets. Because of its small size, such a riveter is capable of reaching difficultly accessible rivets which cannot ordinarily be subjected to cold heading.

The riveting tool 13 is advanced and retracted by fluid under pressure delivered alternately to opposite faces of piston 11 in cylinder 12. To secure quick advance of the riveting tool into operative engagement with the rivet, fluid is supplied to the riveter in large volumes at relatively low pressure, in this instance at pressures up to 1,000 pounds per square inch. The latter pressures being incapable in this instance of completely heading the rivet (although they may commence the upsetting of the rivet), the power apparatus 14, presently described, is designed thereupon to supply fluid under exceedingly high pressures, up to 5,000 pounds per square inch, which render the riveter capable of exerting the final squeeze which heads the rivet. The riveter tool is thereupon returned by low pressure fluid supplied in such large volume as to insure a quick return stroke.

The foregoing sequence of operations, including the supply of high pressure fluid to the riveter, makes it possible to design a light weight tool of such mobility as substantially to increase the speed with which the riveter may be moved to successive rivets and the latter headed. To promote the foregoing mobility, the riveter is connected with the power unit 14 through flexible hose lines 15 and 16, the former transmitting the fluid for the advance or power stroke and the latter for the return stroke. Flexible hose capable of transmitting the aforesaid high pressure without excessive expansion or distortion, may be secured upon the open market. One satisfactory type comprises a reinforcing of woven wire wherein the strands run diagonally or spirally around the hose and are covered with a rubberized protective fabric. The inside of the hose is lined with a flexible leak-proof composition. The wire reinforcing, while providing a flexible hose, is of such strength as to prevent undue expansion of the hose under pressure, thereby minimizing the volume of fluid (and waste energy) consumed in expansion or stretching of portions of the apparatus under the high pressures developed.

Figure 1:
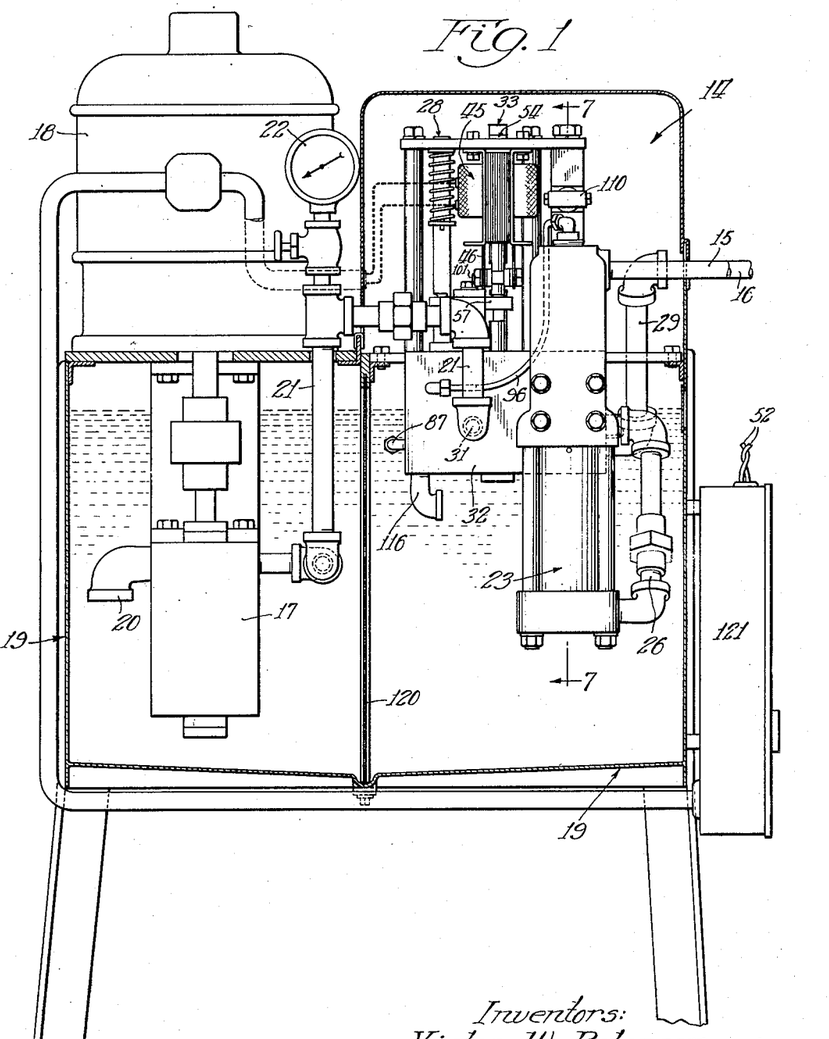
Fig. 1 is an elevation of the individual power unit of the apparatus, the surrounding housing being shown in section.
Figure 2:
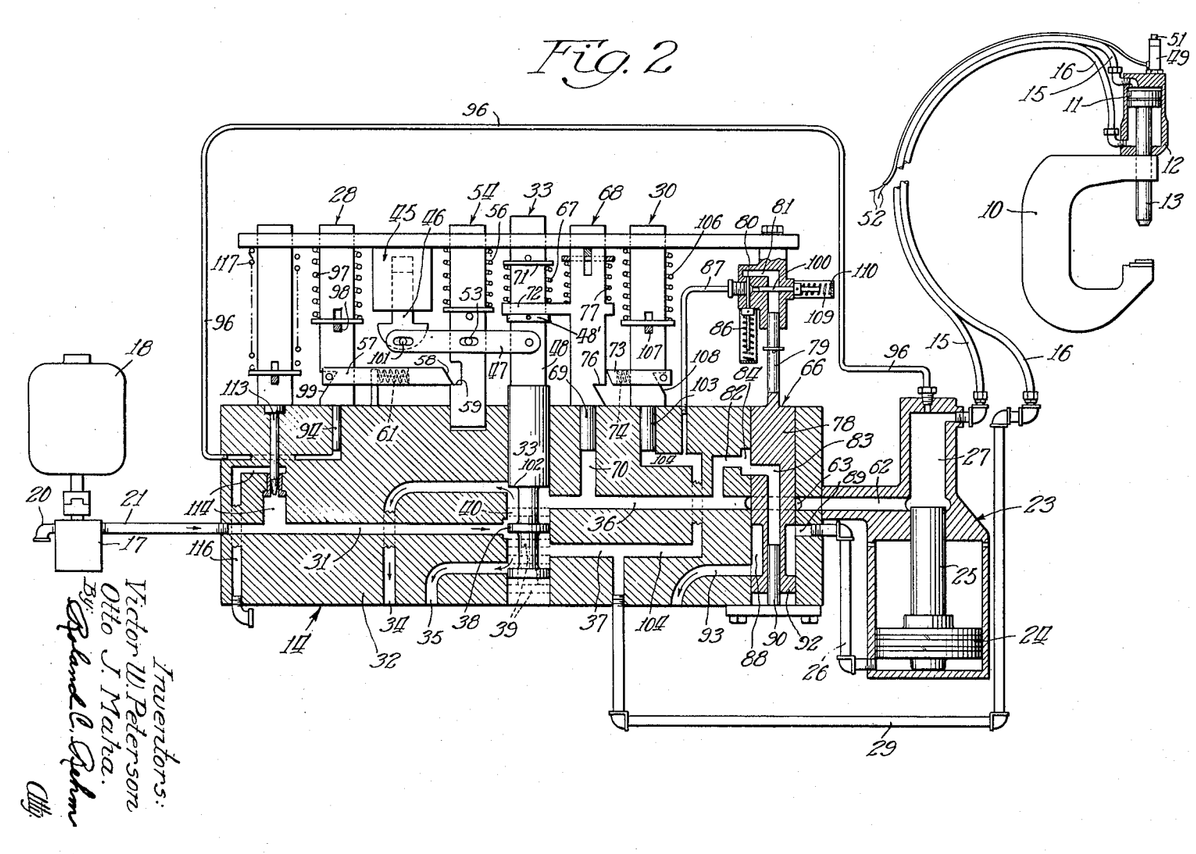
Fig. 2 is a diagrammatic view in the form of a section taken approximately on the broken plane 2—2 of Fig. 8, illustrating the operation of the power unit, the latter being here shown connected through flexible hose with a portable yoke riveter.
Figure 3:
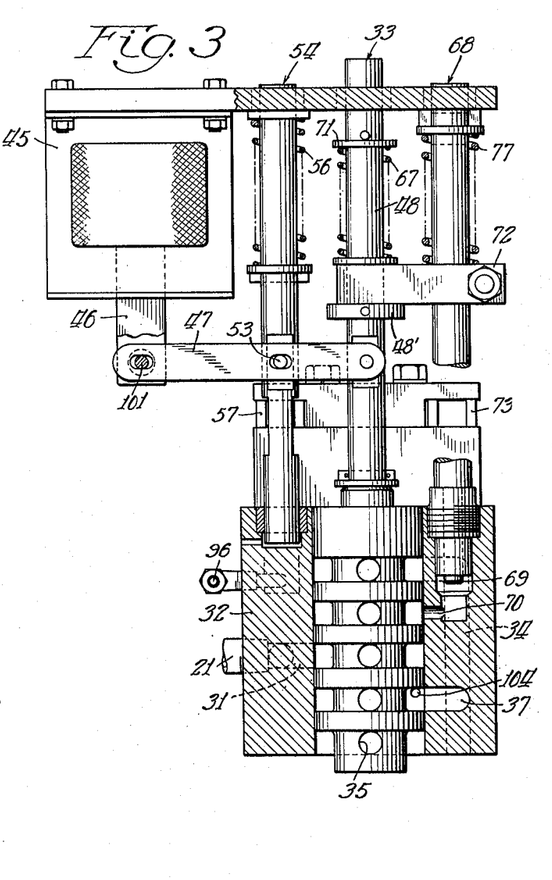
Fig. 3 is a vertical section through the main or primary control valve, taken on the plane 3—3 of Fig. 8, the valve and its port sleeve being shown in elevation.

The aforesaid power unit 14 comprises a pump herein represented by a rotary gear pump 17 driven by electric motor 18 and capable of supplying oil, which in this instance is the pressure fluid, in substantial volume up to approximately 1,000 pounds per square inch (Figs. 1 and 2). The pump in this instance is immersed in a reservoir of oil contained in the case 19 of the apparatus, the oil entering the pump through inlet 20 and leaving through pipe 21. A pressure gauge 22 indicates the pressures developed by the pump. In the present instance, the motor and pump operate continuously during use of the apparatus, but except for the periods when the riveting tool is actually in operation, the fluid delivered by the pump is short circuited or returned to the reservoir at practically zero pressure and the motor therefore operates at no load except during the above periods.

Direct pressure from the pump serves to actuate the riveter piston on its forward and return strokes, and the pump is of such capacity as to deliver large volumes of fluid up to 1,000 pounds per square inch, thereby securing rapid movement of the plunger in closing upon the rivet (or other article to be pressed) and in returning. For the squeezing operation or the heading of the rivet which requires but a very short stroke under high pressures, the fluid pressure delivered to the riveter is increased, in this instance, by an intensifier 23 represented by small and large pistons 24 and 25. During operation of the intensifier fluid at pump pressure is delivered through pipe 26 to the face of large piston 24, which has four or five times the area of small piston 25. The latter acts on the fluid in its cylinder 27 and that in the hose 15 and riveter cylinder 12 (being already under approximately 1,000 pounds pressure) and, because of the ratio of piston areas, is capable of raising fluid pressure behind the tool to approximately 5,000 pounds per square inch, this being ample and, indeed, somewhat in excess of that necessary to complete the heading of the rivet. The volume displaced by piston 25 should be sufficient not only to complete the power stroke but for the stretching or expansion of the apparatus and hose lines under the high pressures developed.

The power stroke is in this instance terminated by a controlling device in the form of a pressure actuated device 28 (Figs. 2 and 6) which operates to direct pump pressure through pipe 29 and hose 16 to the return face of the riveter piston and to open the opposite end of cylinder 12 and the intensifier to discharge or exhaust. Termination of the return stroke is controlled by another device 30 (Figs. 2 and 5), in this instance also pressure actuated, which operates to connect both the pump and the line 29 to discharge, thereby dropping the pump pressure to substantially zero and relieving the load on the motor.

The controlling apparatus for effecting the foregoing operations is shown in Figs. 2 to 9, Fig. 2 being a diagram (in the form of a developed section not to scale) intended to illustrate the operation of the controlling elements rather than their exact structure. In the diagram, the control elements have been shown out of their actual relationship for the sake of clarity in illustration of their operation, their actual arrangement being shown in Fig. 8, wherein the broken section line 2—2 shows the planes from which the section was developed. Many structural details have been omitted or illustrated diagrammatically to secure simplicity. Such details are illustrated in other figures of the drawings.

Figure 4:
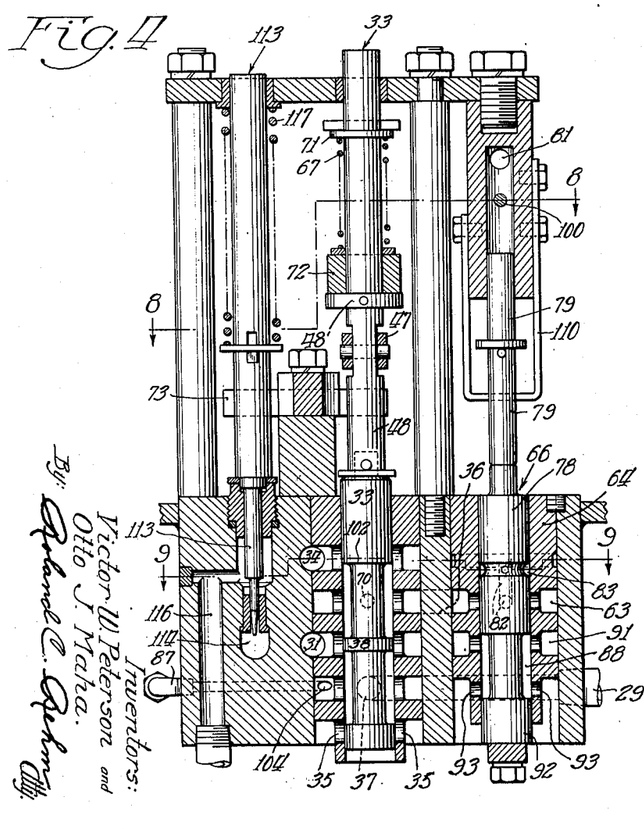
Fig. 4 is a vertical section, taken on the plane 4—4 of Fig. 8 (which is at right angles to the plane of Fig. 3) showing the safety valve, main or primary valve, and intensifier valve.

As here shown, the pump is connected through pipe 21 and the passage 31 in the valve block 32 with a controlling device represented by main or primary valve 33 (Figs. 2, 3, and 4) whose function is to control the delivery of pressure liquid to press cylinder 12 for effecting the forward and return strokes of the piston and for terminating operations at any point in the cycle. The valve is here shown in the form of a double spool or piston valve controlling the passages 34 and 35 leading to exhaust, the passage 36 leading to the power side of the cylinder 12, and the passage 37 which leads to the return side of piston 11. The cylinder valve 33 is shown in its neutral position wherein the pump is short circuited, discharging fluid to its reservoir through passages 34 and 35 (the true nature of passage 35 is shown in Fig. 4 and has been diagrammatically illustrated in Fig. 2), and both the passages 36 and 37 are open to discharge. In its lower position the central web 38 of the valve occupies the position indicated in dotted lines at 39, thereby connecting the pump with the passage 36 (which leads to the power side of cylinder 12) and opens the return passage 37 to discharge. In its upper position, wherein the member 38 occupies the dotted line position 40, the pump is connected to the return passage 37 and the advance passage 36 is connected to discharge.

Figure 6:
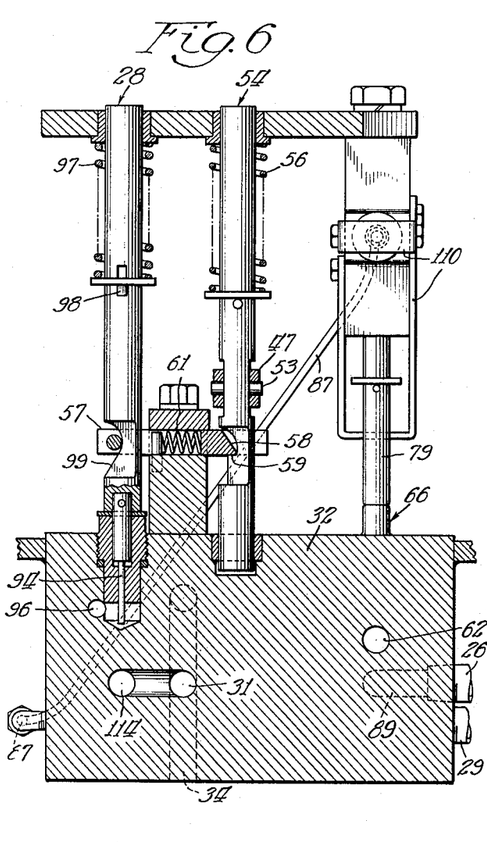
Fig. 6 is a vertical section taken on the plane 6—6 of Fig. 8 showing controlling devices which operate successively at the end of the power stroke for shifting the primary valve to inaugurate the return stroke of the riveter.

The primary valve is here shown controlled by solenoid 45 whose armature 46 is connected through floating lever 47 with primary valve stem 48. Solenoid 45 is controlled by any appropriate electric circuits. The end of the riveter handle 49 is advantageously provided with a push button 51 connected by electric lines 52 with electric circuits which control the solenoid. In the present instance, the controlling circuits are arranged so that the depression of push button 51 closes circuits which cause the armature 46 to be elevated and to remain elevated so long as the push button 51 is held down. The fulcrum 53 of lever 47 is carried upon a shiftable member 54 by which it is possible to change the position of the fulcrum point. At the beginning of a cycle of operations, the member 54 which is normally pressed down by a relatively weak spring 56, is held in its lower position by a latch 57 whose beveled end 58 engages the shoulder 59. Latch 57 is pressed toward fulcrum carrier 54 by spring 61. (Figs. 2 and 6.)

Figure 7:
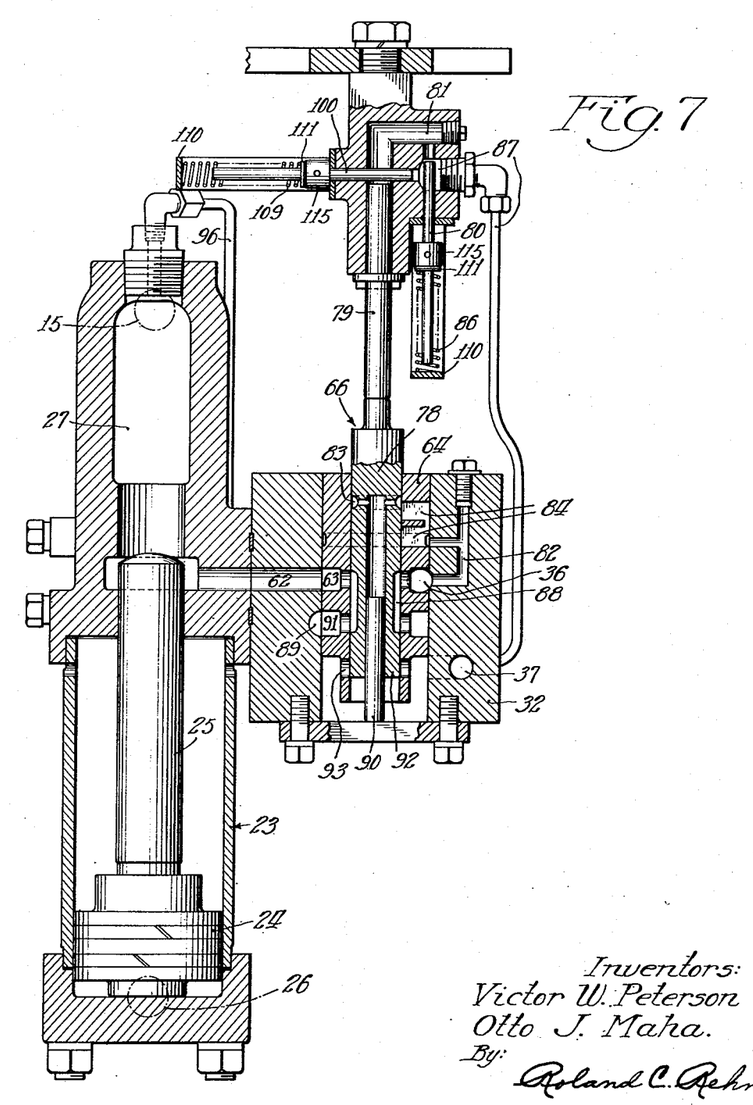
Fig. 7 is a vertical section taken on the plane 7—7 of Fig. 1 showing the intensifier unit and the valve controlling the same.
Figure 8:
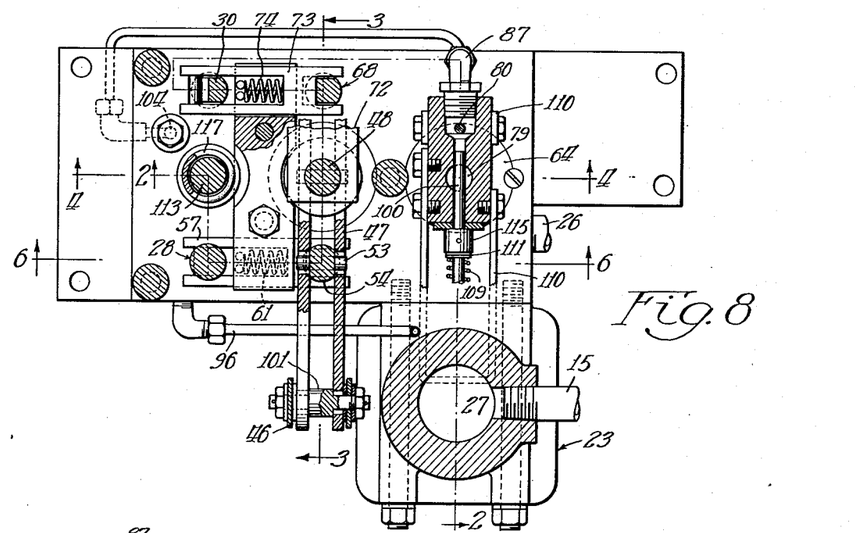
Fig. 8 is a plan section taken on the broken plane 8—8 of Fig. 4 showing the latch devices for holding and releasing certain of the valve controlling elements and the floating lever for controlling the primary valve.
Figure 9:
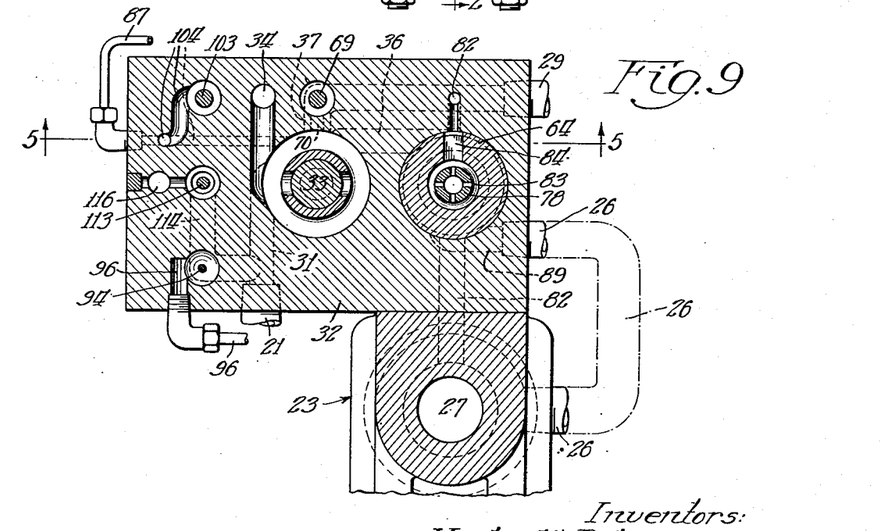
Fig. 9 is a plan section through the valve block taken on the broken plane 9—9 of Fig. 4.

The energization of solenoid 45 therefore depresses primary valve 33 (lever 47 oscillating about pivot 53 then held in its lower position), connecting the pump to passage 36 and closing the discharge passages. Assuming the pump to be in operation, fluid is delivered to the advance side of the riveter cylinder 12 through hose 15, reaching the cylinder from passage 36 through passage 62 which leads to intensifier cylinder 27 whose piston 25 at that time is retracted to clear passage 62 (Figs. 2 and 7). Passage 62 is connected to passage 36 by passage 63 which travels around port sleeve 64 surrounding intensifier control device 66 (Figs. 2, 4 and 7).

As the riveter piston advances, the fluid on its opposite face is freely discharged through hose 16, pipe 29, passage 37, around valve 33, through passage 35 to the reservoir.

Figure 5:
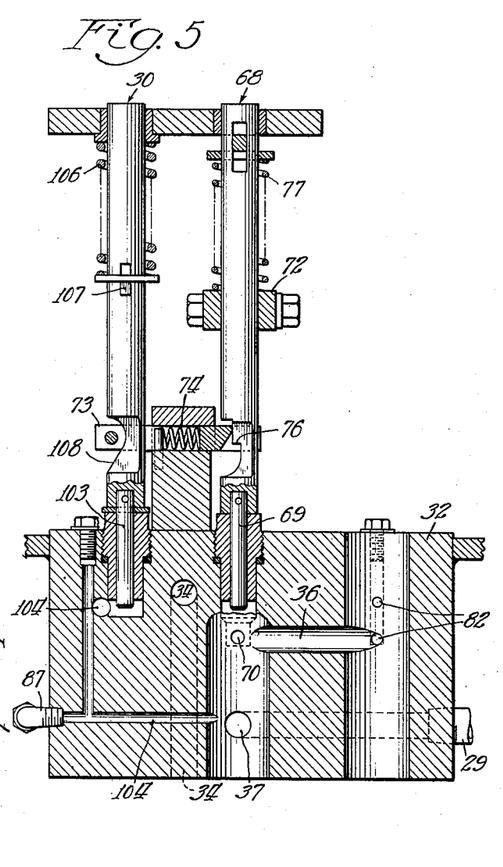
Fig. 5 is a vertical section taken on the plane 5—5 of Fig. 9 showing controlling devices which operate successively at the end of the return stroke of the riveter for restoring the primary valve to its neutral position.

The energy for returning valve 33 is advantageously supplied not by electric means such as a solenoid, but by mechanical means herein represented by spring 67 surrounding primary valve shaft 48 and a pressure actuated pin 68 whose piston 69 is subjected to the fluid pressure in passage 36 to which it is connected by passage 70, such pressure building up substantially immediately after the pump pressure is connected therewith by the depression of valve 33 as aforesaid. The depression of valve 33 partly compresses spring 67 which is shown located between a collar 71 on valve stem 48 and a support 72 carried by and projecting from pin 68. The compression or energization of spring 67 is completed when pin 68 is elevated under the aforesaid fluid pressure exerted on its piston 69. The pin is held in elevated position in this instance by a latch 73 urged toward the pin by spring 74 and which, after elevation of pin 68, snaps under the shoulder 76 (Figs. 2 and 5). Pin 68 is pressed downwardly by a relatively weak spring 77. As will presently appear, the foregoing arrangement makes it unnecessary to employ a double acting solenoid and additional electric circuits to secure the several operations of primary valve 33.

When the riveter tool 13 has advanced until it closes upon the rivet, the pump pressure builds up to a predetermined limiting pressure, in the present instance from 900 to 1000 pounds per square inch, at which pressure the intensifier control device 66 (Figs. 2 and 7) is set to operate. The latter is here represented by a pressure controlled valve piston 78, which is moved upwardly when the aforesaid predetermined pressure (of 900 to 1000 pounds) is reached, and connects the pump pressure to the large piston 24 of the intensifier by which the final squeeze or high pressure is applied. Since the application of the latter is under pressure control, it may occur at any point in the stroke of the press plunger (i. e., whenever the pump pressure builds up under the resistance encountered), and not, as is the case with a mechanical intensifier, at a precise point in the stroke of the riveter. (Figs. 2, 4 and 7.)

The mechanism controlling the operation of valve piston 78 when the predetermined pump pressure is reached, is designed to prevent reaction on or chattering of the valve during the transfer of pressure to piston 24 of the intensifier. The present mechanism operates to relieve the resilient forces built up by raising of valve piston 78, and thereby prevents their subsequent reaction on the valve piston in the event the upward pressure upon it is subsequently reduced below that necessary to operate the valve in the first instance. As here shown, the valve piston is provided with a plunger 79 whose movement is resisted by a small spring controlled plunger 80 connected by passage 81 with the volume of oil acted on by plunger 79. Both plungers 79 and 80 have a lapped fit with their respective bores to prevent oil leakage.

Fluid pressure reaches the intensifier control valve through passage 82 connected to passage 36 and acts on the small area represented by the inner bore or hollowed portion 83 on the interior of valve piston 78 which is in communication with passage 82 through ports 84. The stroke of control valve 78 is represented by the difference in positions between that shown in Fig. 2 and that shown in Fig. 7. The ports 84 in port sleeve 64 with which passage 82 communicates, are made high enough to maintain communication between passages 82 and 84 throughout the stroke of valve 78 (Fig. 7).

By exposing only a small area of valve 78 to fluid pressure, a relatively light spring 86 may be employed for counterbalancing the valve. When the fluid pressure rises as aforesaid, sufficiently to compress spring 86 and operate plunger 80, the latter uncovers a passage 87 (Figs. 2 and 7) which is thus placed in communication with passage 81. The fluid in the latter passage is thereby allowed to escape into passage 87 which is in connection with return passage 37, then opened to discharge. Spring 86 is thereby relieved to such an extent that it is incapable of lowering plunger 79 and valve 78 in the event the fluid pressure should momentarily drop.

The opposite end of bore 83 in the intensifier control valve is closed by a stationary pin 90 over which the valve piston slides.

Sustained pressure of the aforesaid predetermined value (900 to 1000 pounds) which is built up when the riveter tool 13 encounters substantial resistance to further advance, is delivered to valve 78, raising the latter and placing the fluid supply passage 36 in communication with the large piston 24 of the intensifier. Such communication occurs when the space 88 surrounding the reduced portion of the intensifier piston registers (by the raising of the piston) with both the passage 36 and the conduit 26. The latter is connected by passage 89 with port 91 in the port sleeve 64 (Figs. 2, 4 and 7). In the aforesaid elevated position, the lower end 92 of valve piston 78 closes discharge passage 93. The actual details of the latter are shown in Fig. 7, its illustration in Fig. 2 being diagrammatic. While the passage 36 may momentarily remain in communication with passage 62 leading into the upper portion of the intensifier cylinder, the latter passage is presently cut off by the intensifier piston 25 when the latter starts its power stroke (Figs. 2 and 7). Continuous communication prior to this point insures that the intensifier cylinder 27 and the hose line 15 will be kept full of fluid under pressure then existing (900 to 1000 pounds per square inch), thereby avoiding any lost motion on the part of the intensifier piston.

As soon as piston 25 closes passage 62, the volume of fluid contained in the intensifier cylinder 27, the hose line 15 and riveter cylinder is subjected to an intensified pressure represented by the ratio (in this case about four to one) of the areas of pistons 24 and 25. The present ratio is sufficient to develop a pressure in the riveter cylinder up to 5000 pounds per square inch. This is adequate, with a riveter cylinder bore of about three inches, to deliver a force from 30,000 to 35,000 pounds to complete the heading of the rivet. The interval of time consumed in the actual heading or squeezing of the rivet is necessarily very small since the travel of riveter tool 13 during the heading operation is small.

The power stroke is terminated upon the completion of the heading of the rivet, in this instance, when the pressure builds up to a point in excess of that necessary to complete the heading of the rivet. Such predetermined pressure (about 5000 pounds per square inch in this case) serves to actuate the control device 28 which effects movement of primary valve 33 to return position. As here shown, the device 28 is in the form of a small diameter piston 94 (Figs. 2 and 6) subjected to the fluid pressure on the power stroke. In the present instance the piston operates in a bore in valve block 32 and is connected with the intensifier cylinder by a small bore pipe 96 (Figs. 1 and 2). Until the pressure reaches the predetermined high point (about 5000 pounds per square inch), spring 97 holds the piston against movement. The spring tension is adjusted (by employing a pin or key 98 of appropriate thickness) to counterbalance the valve against all pressures below such predetermined high pressure. When the valve is thus operated, the cam surface 99 on the device 28 retracts latch 57 to release the fulcrum pin carrier 54 (Figs. 2 and 6). This allows spring 67 which has been previously fully compressed, to elevate the primary valve to its upper position, lever 47 pivoting about the pivot 101 on the solenoid core and thereby raising the fulcrum pin carrier 54 so that its shoulder 59 no longer aligns with latch 57. In its upper position (with the valve member 38 in the dotted line position 40, Fig. 2), the primary valve connects the fluid pressure supply with return passage 37 and places passage 36 in communication with discharge passage 34, the upper edge 102 of the valve spool having uncovered the port leading to passage 34.

The return side of the riveter cylinder is thus subjected to pump pressure and the riveter piston is returned to initial position. Simultaneously, the pressure in return passage 37 is delivered through passage 87 to the small spring controlled pressure plunger 100 which recedes until its bore is opened to passage 81, exposing plunger 79 to pressure and returning valve plunger 78 to its initial position (Fig. 2). Plunger 80 is unaffected since the return pressure is never sufficient to depress it. The fluid in bore 83 escapes freely through passages 82 and 36, ports 84 being sufficiently high to maintain communication between bore 83 and passage 82 in all positions of valve plunger 78. Valve plunger 78 having now uncovered discharge passage 93, intensifier piston 25 is returned to initial position by the return of press piston 11, the fluid in front of piston 24 escaping freely through pipe 26, passage 88 to discharge passage 93. At the end of its return stroke, intensifier piston uncovers passage 62 which is connected to passage 36, also connected by primary valve 33 with discharge (Fig. 2).

As soon as the pressure in intensifier cylinder 27 falls (upon operation of primary valve 33 as aforesaid), plunger 94 of the controlling device is returned by its spring 97 to initial position and releases latch 57. The latter cannot, however, engage shoulder 59 on the fulcrum pin carrier 54 since the latter is held in slightly elevated position by spring 67.

When the intensifier piston reaches the end of its return stroke, primary valve 33 is returned to its neutral position (that indicated in Fig. 2) wherein both the pump line 31 and passages 36 and 37 are connected to discharge. The aforesaid operation is effected by the control device 30 which in this instance is operated by a predetermined pressure in return line 37. As here shown, the control device 30 is in the form of a plunger 103 communicating through passage 104 with return line 37. Operation of the piston 103 is controlled by spring 106 which is set by adjusting key 107 to yield under a predetermined pressure in return line 37. Operation of plunger 103 as aforesaid occurs when the riveter piston 11 has reached the end of its return stroke and the pump builds up pressure in the return line, in this case to about 900 pounds. When such predetermined pressure is reached, the spring 106 yields and the resulting movement of plunger 103 and the cam surface 108 carried thereby operates to retract latch 73 and to release the pin 68 (Figs. 2 and 5). The latter then returns to its initial position under the action of its spring 77, thereby relieving the compression in spring 67 and allowing valve 48 to return to its neutral position (see Fig. 2). Return of pin 68 is not opposed by piston 69 since the pressure in line 36 is practically zero. In the present instance spring 77 on pin 68 also assists in returning the primary valve 33 to neutral position. As here shown, when pin 68 and support 72 descend, the latter, through engagement with collar 48' (pinned to the primary valve), moves the primary valve to neutral position. Spring 67 (which is then in its normal position) prevents the valve from falling below neutral position.

On the return of primary valve 33 to neutral position, lines 36, 37, 87 and the supply line 31 are all connected to discharge and the pressure in the entire system falls practically to zero, the pump now operating idly at practically no load. With release of pressure in passage 87, plunger 100 is returned by its spring 109 to initial position.

The foregoing cycle cannot be repeated with the present mechanism until the operator deenergizes the solenoid by release of button 51 since until that occurs, the fulcrum point 53 is held in fixed position by latch 57. Upon deenergization of the solenoid, spring 56 moves fulcrum pin carrier 54 to its initial position where it is held by engagement of the latch 57 with shoulder 59. Subsequent energization of the solenoid thereupon inaugurates a new cycle of operations. The foregoing arrangement advantageously prevents indefinite repetition of the cycle in the event the operator fails to release push button 51 on the completion of a cycle. Each cycle therefore requires the release and subsequent operation of the push button on the part of the operator.

It should be noted that the foregoing mechanism is in this instance designed to interrupt the power stroke at any point simply by releasing push button 51 to break the solenoid circuit. Upon such release the return stroke is inaugurated, but the latter may be interrupted to resume the power stroke if the push button be again depressed. Furthermore, in the present instance, it is not necessary to complete a return stroke before it is possible to inaugurate another power stroke. Hence the operator may start a power stroke just as soon as the riveter is positioned whether or not the return stroke has been completed.

Assuming the operator release the push button during the power stroke (at which time the primary valve is in its lower position and fulcrum 53 is still held in its initial position by latch 57), the spring 67 raises primary valve 33 to its upper or return position. Since the pin 68 has been raised and held in elevated position by latch 73 (this occurs practically immediately upon inauguration of a cycle), spring 67 is compressed sufficiently to raise the primary valve 33 to its return position and not simply to its neutral position. Location in neutral position would occur only after pin 68 had been released to place spring 67 in unstrained condition. Lever 47 in this case pivots about fulcrum 53 and not about fulcrum

101 as is the case when the return stroke is inaugurated in a normal cycle of operations.

Return of the riveter piston therefore commences and the cycle will continue until the piston reaches its initial or starting position, as above described, unless in the meanwhile, i. e., before complete return of the piston, the push button be again depressed. In that event the primary valve 33 is moved to its extreme or advance position and the pump is again connected to the advance side of the riveter piston. When the riveter piston is not permitted to return to the end of its stroke, maximum pressure does not develop in the return line 37 and latch 73 is therefore not actuated to release pin 68, the latter remaining in its elevated position. It is released only when the piston is completely returned.

Springs 86 and 109 controlling respectively plungers 80 and 100 (Figs. 2 and 7) are advantageously supported by hinged stirrups 110 which may be swung aside to clear the springs for purposes of adjustment. The spring pressure is advantageously regulated in this instance, by adjusting the number of washers 111 lying between the respective springs and the collars 115 on the respective plungers 80 and 100. It will be noted that the pressure created in passage 81 by the use of plunger 79 is not impressed upon plunger 100, but only on plunger 80. When the latter is depressed sufficiently to uncover the end of plunger 100, the pressure is relieved through passage 87. On the other hand, return pressure in the latter passage is not connected to plunger 80 but only on plunger 100 and (after the latter has receded) on plunger 79. By this arrangement, operation of valve plunger 78 in one direction may be effected by pressures wholly different from those to which it responds in the other direction. Moreover, the energy delivered to the controlling springs to operate the valve is not reimpressed on the valve at any later stage in the cycle. In this instance the springs are restored to their initial condition independently of plunger 79.

A safety valve 113 is installed in the pump line 31 to relieve the system if excessive or destructive pressures be developed for any reason. The safety valve is normally held in a position closing the passage 114 leading to discharge passage 116 by spring 117 whose tension is adjusted to open the valve when the pump pressure reaches a pressure above normal operating pressures.

A removable filter screen 120 separates the pump inlet from the discharge orifice of the unit.

A control box 121 for motor 18 is advantageously carried by the apparatus. The unit is thus completely mobile and independent, requiring only a source of electric power which because of the relatively low power requirements, may be supplied by a light flexible power cord.

Obviously, the invention is not limited to the details of the illustrative construction since these may be variously modified. Moreover, it is not indispensable that all features of this invention be used conjointly since various features may be used to advantage in different combinations and subcombinations.

Having described our invention, we claim:

1. A press of the character described comprising in combination a hydraulic press cylinder and piston, a source of primary pressure fluid for operating said press piston to cause the same to close upon the work, an intensifier for increasing the fluid pressure delivered to said press cylinder, an intensifier valve subjected to said primary pressure in a direction tending to open it for connecting the primary pressure source to said intensifier, a spring loaded valve controlling said intensifier valve and yieldable at a predetermined pressure to permit opening of said intensifier valve, a trapped body of fluid for transmitting pressure between said spring loaded valve and said intensifier valve, a port controlled by said spring loaded valve and uncovered upon yielding of said spring for allowing said body of fluid to escape to prevent reaction of said spring on said intensifier valve, and means for restoring said body of fluid prior to the next operation of said intensifier.

2. A press of the character described comprising in combination a hydraulic press cylinder and piston, a pump for delivering pressure fluid to said press cylinder, an intensifier for increasing the pressure delivered to said press cylinder, an intensifier valve subjected to said primary pressure in a direction tending to open it for connecting the pump to said intensifier, a spring controlling said intensifier valve and yieldable at a predetermined pressure to permit opening of the intensifier valve, force transmitting means for transmitting the force of said valve to said spring, means effective on the opening of said valve to prevent transmission of force through said force transmitting means from said spring to said valve in the event of reduction of pump pressure, and mechanism for restoring said force transmitting means to operative condition at a subsequent stage in the cycle of operations of said press.

3. A press of the character described comprising in combination a hydraulic press cylinder and piston, a source of primary pressure fluid for operating said press cylinder to cause the press to close upon the work, an intensifier having a high and low pressure piston for increasing the liquid pressure delivered to said press cylinder, an intensifier valve subjected to said primary pressure in a direction tending to open it for connecting the primary pressure source to the low pressure intensifier piston, mechanism controlling the opening of said intensifier valve and operable at a predetermined pressure to permit opening of said intensifier valve, means for rendering said mechanism inoperative to close the valve after the opening of said valve in the event the pressure falls below said predetermined pressure, and means for closing said intensifier valve upon completion of operation of the intensifier.

4. Apparatus of the character described comprising in combination a power applying tool having a double acting press cylinder and piston, a pump for delivering liquid in substantial volume and at moderate pressure to said cylinder to secure the rapid advance or return of said piston, a main valve having forward, reverse and neutral positions, respectively, for advancing and returning said piston and for idling said pump, a single acting pressure intensifier having low and high pressure pistons and cylinders, a pump line leading from said main valve to said high pressure cylinder and another line leading from the high pressure cylinder to said press cylinder so that said high pressure cylinder constitutes a part of the passage from the pump to said press cylinder, said high pressure piston being adapted on its initial advance to cut off said line from said pump, valve mechanism operative at predetermined pump pressure to connect said pump with the low pressure intensifier cylinder while maintaining pump pressure in said line to said high pressure cylinder, and means responsive to predetermined maximum pressure in said high pressure cylinder for automatically operating said main valve at the end of the work stroke of said press piston for delivering pump pressure to the return side of said press piston to effect return of the latter and of said intensifier pistons.

5. Apparatus of the character described in combination a power applying tool having a double acting press cylinder and piston, a pump for delivering liquid in substantial volume and at moderate pressure to said cylinder to secure the rapid advance or return of said piston, an intensifier having low and high pressure pistons and cylinders, a line leading from said pump to said high pressure cylinder, another line leading from a high pressure cylinder to said press cylinder so that the high pressure cylinder constitutes a part of the passage from the pump to said press cylinder, said high pressure piston being adapted on its initial advance to cut off said line from said pump, an intensifier valve subjected to pump pressure in a direction to open it for connecting pump pressure to said low pressure intensifier cylinder while maintaining pump pressure in said line to said high pressure cylinder, a spring loaded valve controlling said intensifier valve and yieldable at a predetermined pressure to permit opening of said intensifier valve, a trapped body of fluid for transmitting pressure between said spring loaded valve and said intensifier valve, a port controlled by said spring loaded valve and uncovered upon yielding of said spring for allowing said body of fluid to escape to prevent reaction of said spring on said intensifier valve, and means for restoring said body of fluid prior to the next operation of said intensifier.

6. A press of the character described comprising in combination a double acting hydraulic press cylinder and piston, a pump for delivering large volumes of low pressure liquid to said press cylinder to cause the press quickly to close upon the work, an intensifier having high and low pressure cylinders and pistons therein for increasing the liquid pressure delivered to said press cylinder, an intensifier valve, means responsive to pump pressure for moving said intensifier valve to apply pump pressure to said low pressure cylinder to advance the intensifier, a main valve for controlling the forward and return strokes of said press piston, valve operating mechanism operated by a predetermined pressure in said high pressure cylinder for moving said main valve to return position, a device responsive to pressure on the return side of said press piston for moving said intensifier valve to open the low pressure cylinder to discharge, and a control device independent of said predetermined pressure for operating said main valve to effect immediate reversal of the travel of said piston.

7. Apparatus of the character described comprising in combination a double acting work cylinder and piston, a continuously operating pump for delivering pressures substantially higher than those obtainable from a centrifugal pump, a main valve having forward, reverse and neutral positions for connecting said pump respectively to the forward and reverse ends of said work cylinder and for idling said pump, an intensifier for increasing the pressure in said work cylinder, an intensifier valve for directing pump pressure to said intensifier to operate the latter, intensifier controlling mechanism responsive to predetermined pressure in said work cylinder for operating said intensifier valve, means responsive to intensifier pressure for shifting said main valve to reverse position, and means operative at predetermined pressure on said reverse end of the work cylinder for moving said main valve to neutral position at the end of the reverse travel of said work piston.

8. Apparatus of the character described comprising in combination a double acting work cylinder and piston, a continuously operating pump, a main valve having forward, reverse and neutral positions for connecting said pump respectively to the forward and reverse ends of said work cylinder and for idling said pump, an intensifier for increasing the pressure in said work cylinder, an intensifier valve for directing pump pressure to said intensifier to operate the latter, intensifier controlling mechanism including means responsive to predetermined pressure in said work cylinder for operating said intensifier valve to connect said pump with said intensifier, said intensifier controlling mechanism also including means responsive to pressure delivered to the reverse side of said work piston for returning said intensifier valve to initial position, means responsive to predetermined pressure in said intensifier for moving said main valve to reverse position, and means responsive to predetermined pressure on the return side of said work piston for moving said main valve to neutral position.

9. Apparatus of the character described comprising in combination a double acting work cylinder and piston, a continuously operating pump, a main valve having forward, reverse and neutral positions for connecting said pump respectively to the forward and reverse ends of said work cylinder and for idling said pump, an intensifier for increasing the pressure in said work cylinder, an intensifier valve initially in discharge position and movable to operative position to direct pump pressure to said intensifier to operate the latter, intensifier controlling mechanism including means responsive to predetermined pressure in said work cylinder for operating said intensifier valve to connect said pump with said intensifier, said intensifier controlling mechanism also including means responsive to pressure delivered to the reverse side of said work piston for returning said intensifier valve from operative position to initial position to open said intensifier to discharge, means responsive to predetermined pressure in said intensifier for moving said main valve to reverse position, and manually controlled means for operating said main valve to reverse the travel of said work piston at any stage in its cycle of operation.

10. Fluid pressure apparatus comprising in combination a source of pressure fluid, forward and return pressure lines for conducting said pressure fluid to a double-acting work cylinder or the like, a single control valve having forward, reverse and neutral positions for connecting said pressure source with either of said pressure lines, valve actuating mechanism for operatively engaging said valve to move the latter to forward position, said mechanism including a spring in normal condition registering said valve in neutral position, mechanism for energizing said spring at the beginning of a cycle for automatically moving said valve to reverse position upon release of said valve, and means for deenergizing said spring at the conclusion of the cycle to restore said spring to normal condition.

11. Apparatus of the character described comprising in combination a double-acting work cylinder having a piston therein, a continuously operating pump for supplying pump pressure to each end of said cylinder, a control valve having forward, neutral and reverse positions for effecting forward and reverse travel of said piston and for neutralizing said pump during idle periods, valve operating means for moving said valve to forward position, said mechanism including a spring connected with said valve and adjusted normally to register the valve with neutral position, means actuated upon movement of said valve to forward position for biasing said spring so that upon release of said valve by said valve operating means the spring will register said valve with reverse position, and means for effecting return of said valve to neutral position at the conclusion of the return stroke of said piston.

12. Apparatus of the character described comprising in combination a double acting work cylinder and piston, a continuously operating pump, a main valve having forward, reverse and neutral positions for connecting said pump respectively to the forward and reverse ends of said work cylinder and for idling said pump, an intensifier for increasing the pressure in said work cylinder, an intensifier valve for directing pump pressure to said intensifier to operate the latter, intensifier controlling mechanism responsive to predetermined pressure in said work cylinder for operating said intensifier valve, means responsive to intensifier pressure for shifting said main valve to reverse position, means for moving said main valve to neutral position at the end of the reverse travel of said work piston, and manual controlling means for operating said main valve to reverse the travel of said work piston at any point in its cycle of operation.

13. Apparatus of the character described comprising in combination a double-acting work cylinder having a piston therein, a continuously operating pump for supplying pump pressure to each end of said cylinder, a control valve having forward, neutral and reverse positions for effecting forward and reverse travel of said piston and for neutralizing said pump during idle periods, valve operating means for moving said valve to forward position, said mechanism including a spring connected with said valve and adjusted normally to register the valve with neutral position, means actuated upon movement of said valve to forward position for biasing said spring so that upon release of said valve by said valve operating means the spring will register said valve with reverse position, and means responsive to a predetermined pressure on said piston on its return stroke for releasing the bias in said spring to permit the return of said valve to neutral position.

14. Apparatus of the character described comprising in combination a double-acting work cylinder having a piston therein, a continuously operating pump for supplying fluid pressure to each end of said cylinder, a single controlling valve having forward, reverse and neutral positions for directly connecting the respective ends of said work cylinder with said pump and to discharge to effect forward and reverse travel of said piston, said valve in neutral position connecting said pump to discharge to permit it to operate idly, valve actuating means for operatively engaging said valve to move the latter to forward position, means set upon movement of said valve to forward position for automatically moving said valve to reverse position upon release of said valve by said actuating means, and means responsive to predetermined pressure in said cylinder on the return stroke of said piston for automatically returning said valve to neutral position.

15. Apparatus of the character described comprising in combination a double-acting work cylinder having a piston therein, a continuously operating pump for supplying fluid pressure to each end of said cylinder, a single controlling valve having forward, reverse and neutral positions for directly connecting the respective ends of said work cylinder with said pump and to discharge to effect forward and reverse travel of said piston, said valve in neutral position connecting said pump to discharge to permit it to operate idly, means responsive to predetermined pressure in said press cylinder moving said valve to reverse position, and means responsive to predetermined pressure in said press cylinder on its return stroke for moving said valve to neutral position.

16. Apparatus of the character described comprising in combination a double acting work cylinder and piston, a continuously operating pump, a main valve having forward, reverse and neutral positions for connecting said pump respectively to the forward and reverse ends of said work cylinder and for idling said pump, said main valve being normally positioned in neutral and having means normally operative when said main valve is released to return said main valve to neutral, an intensifier for increasing the pressure in said work cylinder, an intensifier valve for directing pump pressure to said intensifier to operate the latter, intensifier controlling mechanism responsive to predetermined pressure in said work cylinder for operating said intensifier valve, means responsive to intensifier pressure for shifting said main valve to reverse position, and means for releasing said main valve at the end of the reverse travel of said work piston to permit return of said main valve to neutral position.

17. Apparatus of the character described comprising in combination a double acting work cylinder and piston, a pump for supplying hydraulic pressure, a pressure intensifier having high and low pressure pistons and cylinders, said pistons being connected to move together as a unit, a supply line leading to said high pressure cylinder and another line leading from the high pressure cylinder to said work cylinder so that the high pressure cylinder constitutes a part of the supply passage to said work cylinder, said high pressure piston being adapted on its initial advance to cut off said line from said pump, means for opening said low pressure intensifier cylinder and said supply line to discharge upon reversal of said work piston, and a line for conducting pressure fluid from said pump to the opposite side of said work piston to secure reversal of the latter and to cause the fluid discharged from said work cylinder on reversal of said piston to effect the return of said intensifier pistons to initial position.

VICTOR W. PETERSON.
OTTO J. MAHA.